US009021705B2

(12) United States Patent
Naldi

(10) Patent No.: US 9,021,705 B2
(45) Date of Patent: May 5, 2015

(54) METHOD OF MAKING A SANDWICH PANEL

(76) Inventor: Valter Naldi, Blogna (IT)

( * ) Notice: Subject to any disclaimer, the term of this patent is extended or adjusted under 35 U.S.C. 154(b) by 908 days.

(21) Appl. No.: 12/679,080

(22) PCT Filed: Sep. 17, 2008

(86) PCT No.: PCT/IT2008/000597
§ 371 (c)(1),
(2), (4) Date: Mar. 19, 2010

(87) PCT Pub. No.: WO2009/040863
PCT Pub. Date: Apr. 2, 2009

(65) Prior Publication Data
US 2010/0227087 A1 Sep. 9, 2010

(30) Foreign Application Priority Data

Sep. 19, 2007 (IT) ............................. BO2007A0631
Apr. 17, 2008 (IT) ............................. BO2008A0235

(51) Int. Cl.
*B21D 47/00* (2006.01)
*B29C 65/00* (2006.01)
*E04C 2/34* (2006.01)
*E04C 2/36* (2006.01)
*B32B 3/22* (2006.01)
*E04C 2/296* (2006.01)

(52) U.S. Cl.
CPC ........... *E04C 2/365* (2013.01); *Y10T 156/1062* (2015.01); *Y10T 428/24752* (2015.01); *Y10T 428/24612* (2015.01); *Y10T 428/13* (2015.01); *B32B 3/22* (2013.01); *E04C 2/296* (2013.01)

(58) Field of Classification Search
CPC ........... E04C 2/365; E04C 2/296; B32B 3/22; B32B 5/14; B32B 7/04; B21D 47/00; B21D 47/04
USPC ........... 29/897.32, 411, 904; 52/782.2, 783.1, 52/783.14, 796.1, 796.11; 156/60, 250, 156/268, 423; 428/172, 189
See application file for complete search history.

(56) References Cited

U.S. PATENT DOCUMENTS

| 2,911,274 | A | * | 11/1959 | Grube ......................... 52/782.2 |
| 4,748,780 | A | * | 6/1988 | Vinther ........................ 52/309.3 |
| 5,351,390 | A | * | 10/1994 | Yamada et al. ................. 29/612 |
| 5,832,692 | A | * | 11/1998 | Opferbeck et al. ........ 52/745.19 |
| 2008/0060319 | A1 | | 3/2008 | Schitter |
| 2009/0202785 | A1 | * | 8/2009 | Meyer Zu Drewer et al. ............................ 428/192 |

FOREIGN PATENT DOCUMENTS

| DE | 10 2004 052931 B3 | 12/2005 |
| DE | 20 2007 011476 U1 | 10/2007 |
| EP | 1 785 272 A | 5/2007 |

(Continued)

*Primary Examiner* — Sarang Afzali
(74) *Attorney, Agent, or Firm* — Ladas & Parry LLP

(57) ABSTRACT

A fully or partly edged panel (10; 200) of wood or wood fiber. The panel (10; 200) includes a sandwich blank (10*; 200*) having outer layers (11) of solid consistency, and at least one supple inner layer (12) with a lightweight, possibly "honeycomb" or supple foam material, structure. The panel (10; 200) is characterized by having at least one spacer (13; 213) inserted between the two outer layers (11) of the blank (10*; 200*) at at least one corner thereof. The peripheral outer faces (15) of the blank (10*; 200*) may be edged with an adhesive edging strip (16). Also described are methods (100; 1000) for manufacturing the panel (10; 200).

8 Claims, 7 Drawing Sheets

(56) References Cited

FOREIGN PATENT DOCUMENTS

| | | | |
|---|---|---|---|
| EP | 1 832 691 A1 | 9/2007 | |
| EP | 2 115 234 B1 | 5/2011 | |
| EP | 2115234 B1 * | 5/2011 | ................ E04C 2/36 |
| GB | 2 266 912 A | 11/1993 | |
| JP | 2001130644 A * | 5/2001 | ........... B65D 81/107 |
| WO | WO 0075450 A1 * | 12/2000 | ................ E04C 1/41 |
| WO | 2005/010293 A | 2/2005 | |
| WO | 2006/037679 A | 4/2006 | |

* cited by examiner

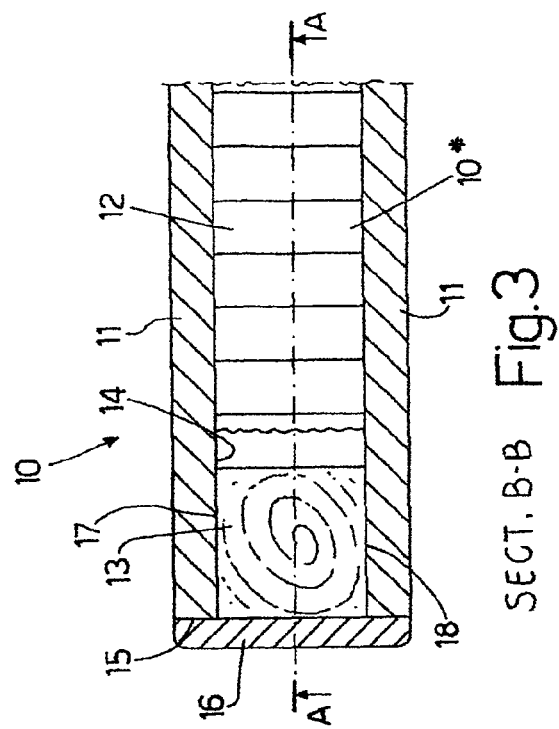
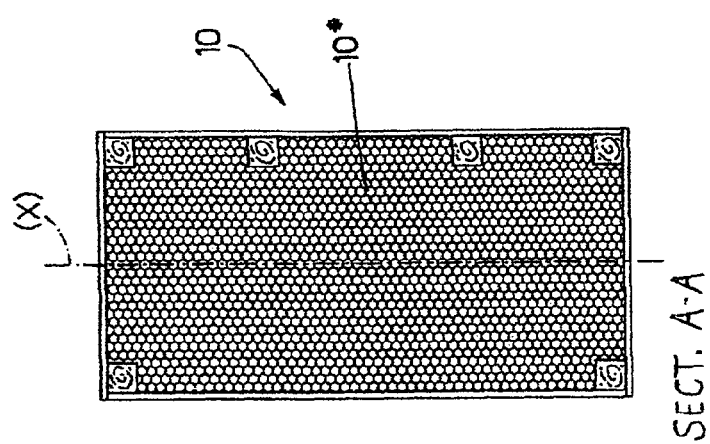
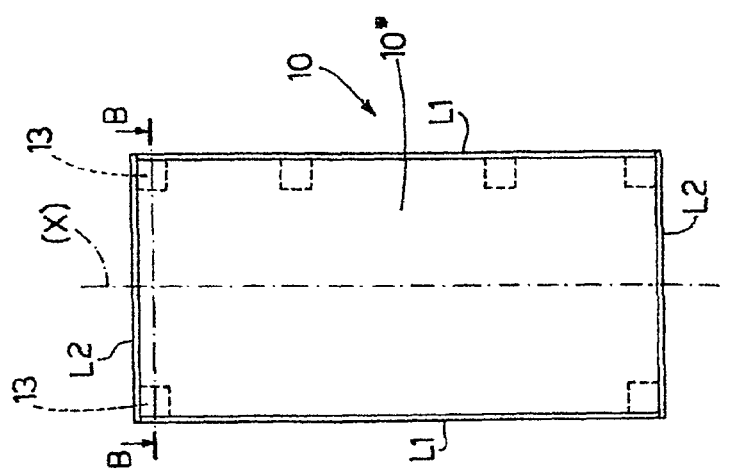

SECT. C-C

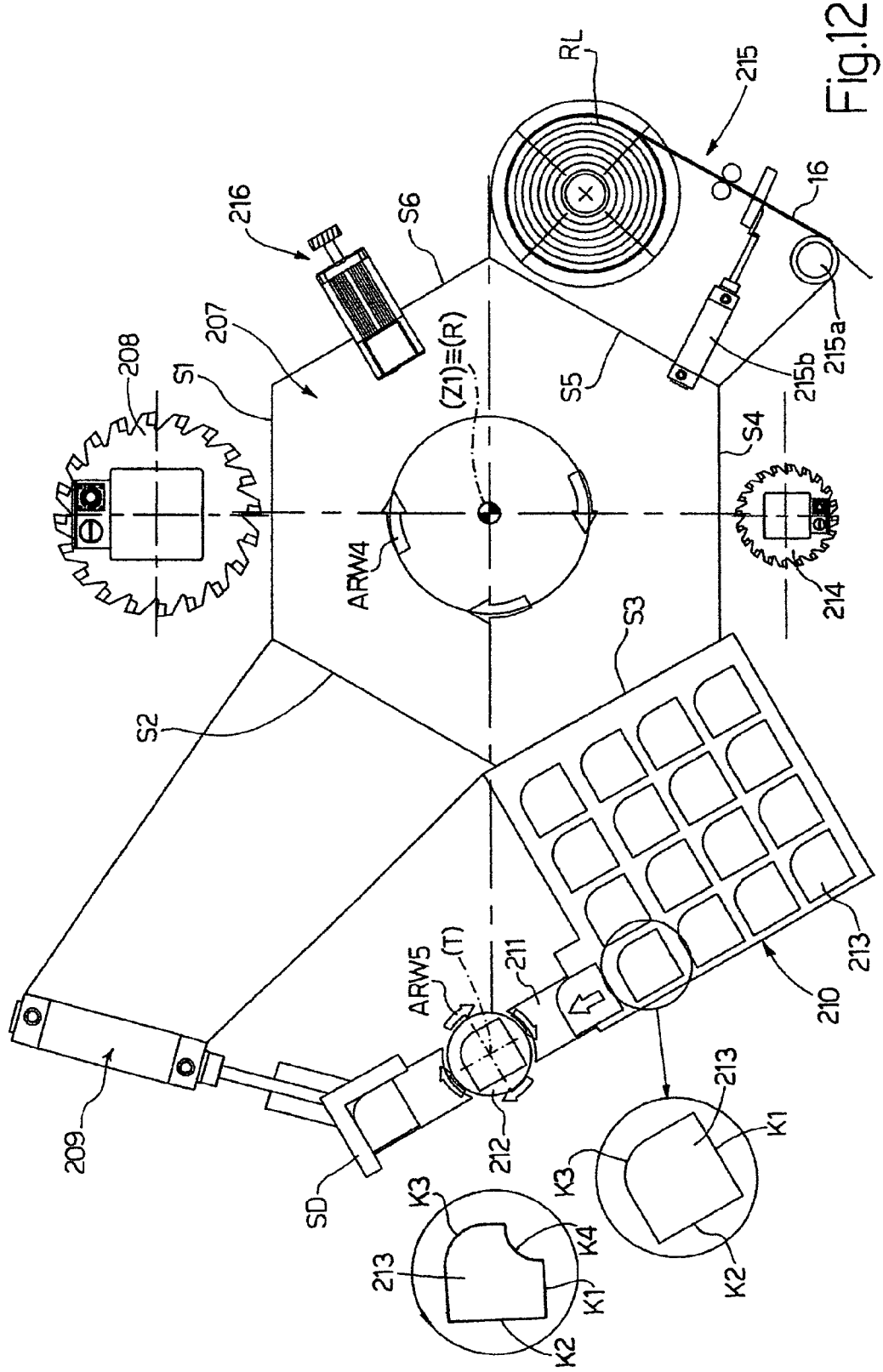

METHOD OF MAKING A SANDWICH PANEL

TECHNICAL FIELD

The present invention relates to a panel and relative manufacturing system and method.

As is known, panels currently used to make furniture are made of wood-fibre materials (chipboard, MDF, etc.) which, by their very nature, have numerous advantages as regards the finishing of furniture component parts.

In particular, being fairly compact, they are ideal for edging, by having a whole surface on which to glue the edging material, and for fitting the necessary manufacturing and assembly hardware (hinges, dowels, etc.).

In recent times, however, conventional panels of the above type have begun to pose serious problems. In particular, they are not light, and, when used in cabinet-making, result in extremely heavy furniture. Moreover, given the increasing shortage of wood, the cost and shortage of 100% wood-fibre panels mean they are used less and less.

A new type of panel is therefore required to replace conventional types.

Two essential features of the new panel, for all-round use in cabinet-making, are:
 as light a structure as possible; and
 a structure with more or less the same mechanical properties as conventional panels.

BACKGROUND ART

A fairly recently marketed new type of panel, for example, has a sandwich structure with only the two outer layers made of wood (possibly with a treated-paper veneered surface), and with a honeycomb cardboard or foam material inner layer, and weighs about a fifth of a conventional panel.

Panels of this sort have the definite advantage of being much lighter than currently used chipboard or MDF (Medium Density Fibreboard) panels, and employ less wood. On the other hand, using current techniques, they fail to provide for effective adhesion of the edging material, for lack of a compact layer, between the outer layers, to which to attach the joins of the edging material at the corners.

Another drawback of this new type of panel is the need for a new type of hardware fittings to ensure furniture of strong make, and which appears to be difficult to achieve on account of the extremely weak nature of the inner layer of the sandwich panel.

A panel of this sort is described in European Patent EP-B1-1 563 970 B1 (IMA Klessmann GmbH).

The panel described in the above patent only partly solves the edging problem, on account of the difficulty in grooving and inserting the reinforcing strips in the remaining two sides, once the first two have been grooved and the reinforcing strips inserted.

That is, since grooving tools are necessarily circular, and not being possible to run out from the ends of the first two sides already edged, tool entry and exit along the second two sides must be programmed accordingly, thus resulting in incomplete grooves along these sides; and the inside end portions of the reinforcing strips must also be rounded off to insert them inside the ends of the incomplete grooves in the second two sides.

Moreover, the sides of the panel must be machined accurately to ensure the reinforcing strip is aligned perfectly with the outer surfaces of the outer layers of the panel.

And the thickness of the reinforcing strip must be perfectly calibrated to match the groove formed in the side.

Neither does the EP-B1-1 563 970 B1 (IMA Klessmann GmbH) solution solve the hardware fitting (hinge, etc.) problem, on account of the part of the panel to which the hardware fitting is fitted being hollow or at any rate weakened by the poor consistency of the inner layer of the panel.

To solve this problem, some makers insert inside the edge of the sandwich panel a long strip of wood, which must be cut to size to match the length of the edge. This results in excessive use of wood, on account of the strip also being fitted to parts of the edge where it is not needed, and the difference between the standard length of the wood strips and the actual length of the panel results in considerable waste.

DISCLOSURE OF THE INVENTION

It is an object of the present invention to provide a panel and relative manufacturing method and system, designed to eliminate the aforementioned drawbacks.

According to the present invention, there are provided a panel and relative manufacturing method and system, as claimed in the accompanying Claims.

BRIEF DESCRIPTION OF THE DRAWINGS

A number of non-limiting embodiments of the present invention will be described by way of example with reference to the accompanying drawings, in which:

FIG. 1 shows a plan view of a panel in accordance with the present invention;

FIG. 2 shows a longitudinal section A-A of the FIG. 3 panel;

FIG. 3 shows a cross section B-B of the FIGS. 1 and 2 panel;

FIG. 12 shows a tool-holder assembly of the second system in FIGS. 10 and 11.

PREFERRED EMBODIMENTS OF THE INVENTION

Figure 4:
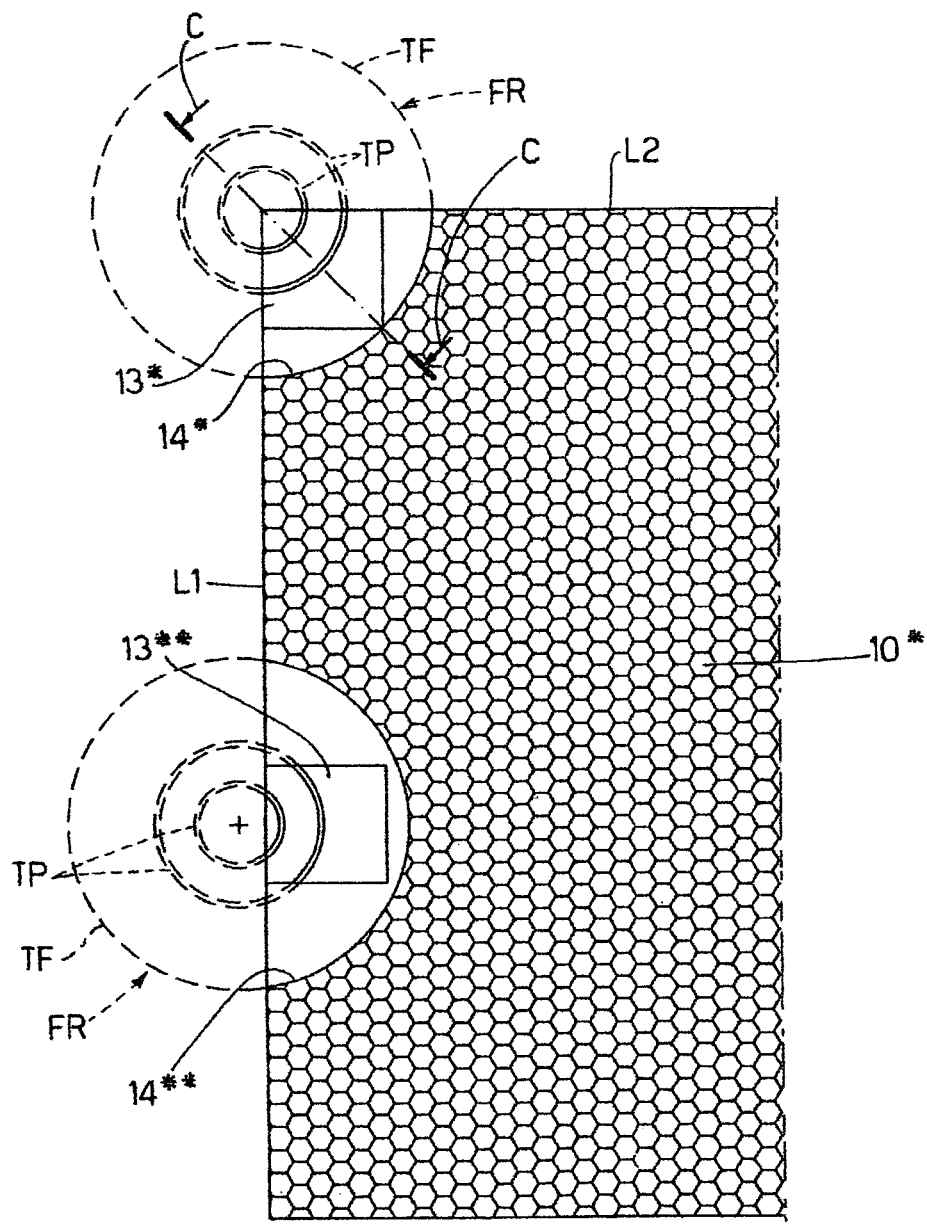
FIG. 4 shows a panel with spacing block-shaped plug-insertion cavities.

Number 10 in FIGS. 1, 2, 3 indicates as a whole a panel in accordance with the present invention.

Panel 10 comprises a sandwich blank 10* cut from a strip (not shown) (or from a large panel) produced in a manufacturing system (not shown). In the FIGS. 1, 2, 3 embodiment, sandwich blank 10* is rectangular, has a longitudinal axis of symmetry (X), and comprises two longitudinal sides L1 parallel to axis (X), and two parallel transverse sides L2 crosswise to axis (X).

As will be seen below, the finished panel 10 is edged along all or part of its perimeter (see below).

Blank 10* has a sandwich structure comprising two solid outer layers 11 (FIG. 3) which may be made, for example, of chipboard or MDF, and between which is interposed a supple inner layer 12 advantageously made of "honeycomb" cardboard or foam material.

Panel 10 in FIGS. 1, 2, 3 is characterized by comprising spacing block-shaped plugs 13 inserted, between the two outer layers 11, inside cavities 14 (FIG. 3) formed by removing part of supple inner layer 12 (see below) or by pressing part of the inner layer inwards of the panel.

The peripheral outer faces 15 of sandwich blank 10* are edged with an adhesive edging strip 16 to form panel 10.

Panel 10 in the FIGS. 1, 2, 3 example is rectangular, but the same considerations also apply to a square, or at any rate square-cornered, panel (not shown).

In an embodiment not shown, cavity 14 goes beyond supple inner layer 12 and also involves part of outer layers 11.

In which case, the depth of cavity 14 equals the width of spacing block-shaped plug 13, and the shoulders (not shown) cut into the inner surfaces of outer layers 11 act as stops when inserting spacing block-shaped plug 13 inside sandwich blank 10*.

FIG. 4 shows a sandwich blank 10* in which a corner cavity 14* and a lateral cavity 14** along one of the two sides L1 are formed using a cutter FR.

A spacing block-shaped plug 13* is inserted inside corner cavity 14*, and a spacing block-shaped plug 13 inside lateral cavity 14.

Cavities 14*, 14** and relative spacing block-shaped plugs 13*, 13** are preferably located at the corners of sandwich blank 10* and/or at the points along the edge of sandwich blank 10* where the hardware is presumably fitted.

Figure 5:
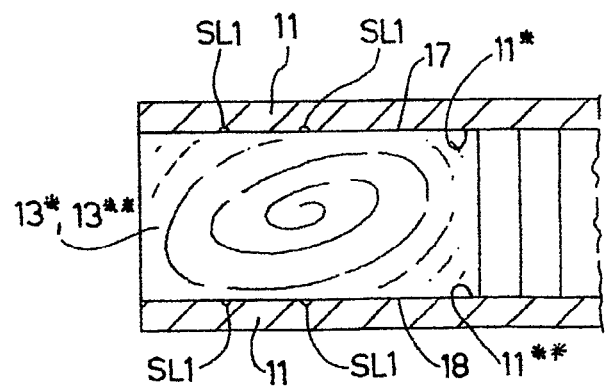
FIG. 5 shows a section C-C of FIG. 4 illustrating glue retaining grooves on the inner surfaces of the outer layers of the panel.

To retain glue on the top surfaces of spacing block-shaped plugs 13*, 13**, cutter FR is equipped with face cutting edges TF and four plane cutting edges TP (only two shown in FIG. 4) for forming corresponding grooves SL1 (FIG. 5) on the inner surfaces 11* of outer layers 11.

Regardless of whether glue is sprayed onto inner surfaces 11* or applied to top and bottom surfaces 17 and 18 of spacing block-shaped plugs 13*, 13**, without glue retaining grooves SL1, it would ooze out when spacing block-shaped plugs 13*, 13** are pushed rapidly inside cavities 14*, 14** by an insertion device (see below), thus resulting in poor adhesion of surfaces 11*, 11** of outer layers 11 to surfaces 17, 18 of spacing block-shaped plugs 13*, 13**.

Figure 6:
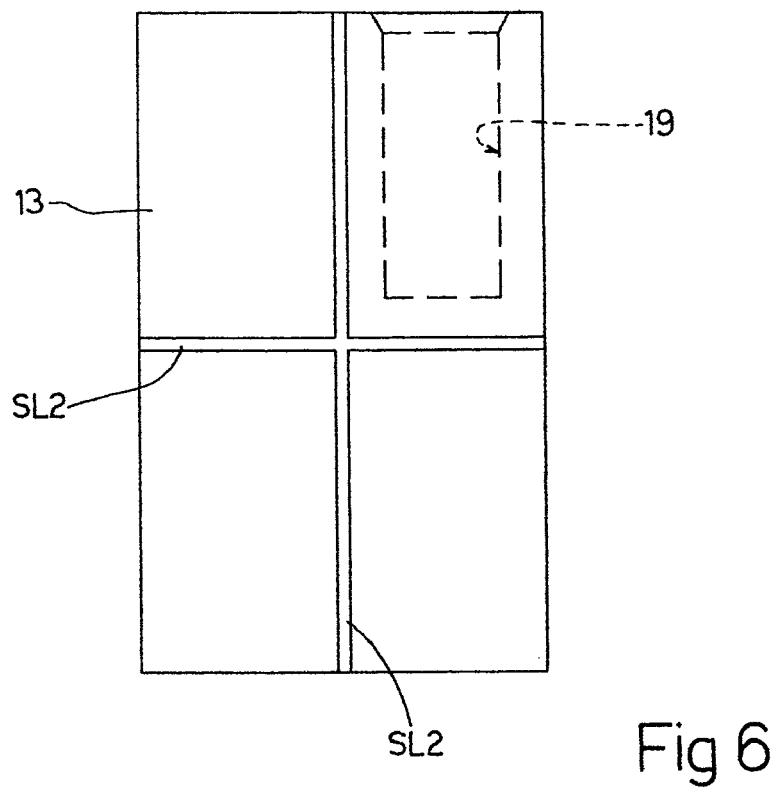
FIG. 6 shows a plan view of a spacing block-shaped plug with glue retaining grooves and a hardware hole.
Figure 7:
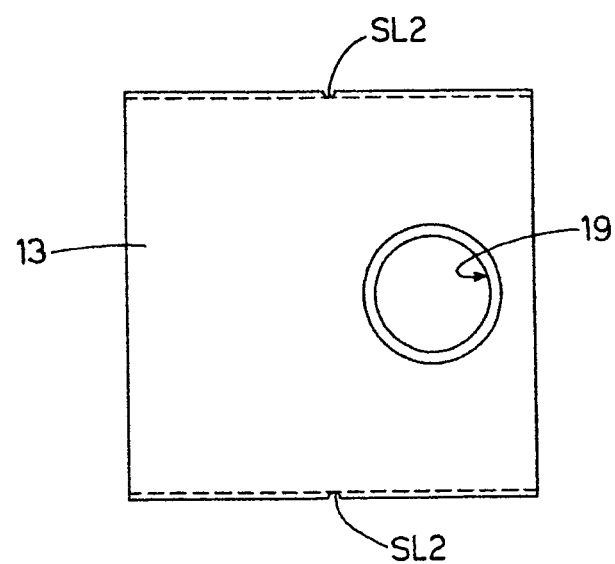
FIG. 7 shows a side view of the FIG. 6 spacing block-shaped plug.

FIGS. 6 and 7 show a spacing block-shaped plug 13 having glue retaining grooves SL2, and a hole 19 for fastening hardware (not shown) to panel 10.

In other words, spacing block-shaped plug 13 may be ready-made complete with glue retaining grooves SL2 and at least one hardware hole 19. Grooves SL2 may be instead of or in addition to grooves SL1.

Spacing block-shaped plug 13 may also comprise other types of seats (not shown), such as a threaded hole, a dove-tail cavity, or similar, by which to fit the hardware of the furniture item produced using panel 10.

Figure 8:
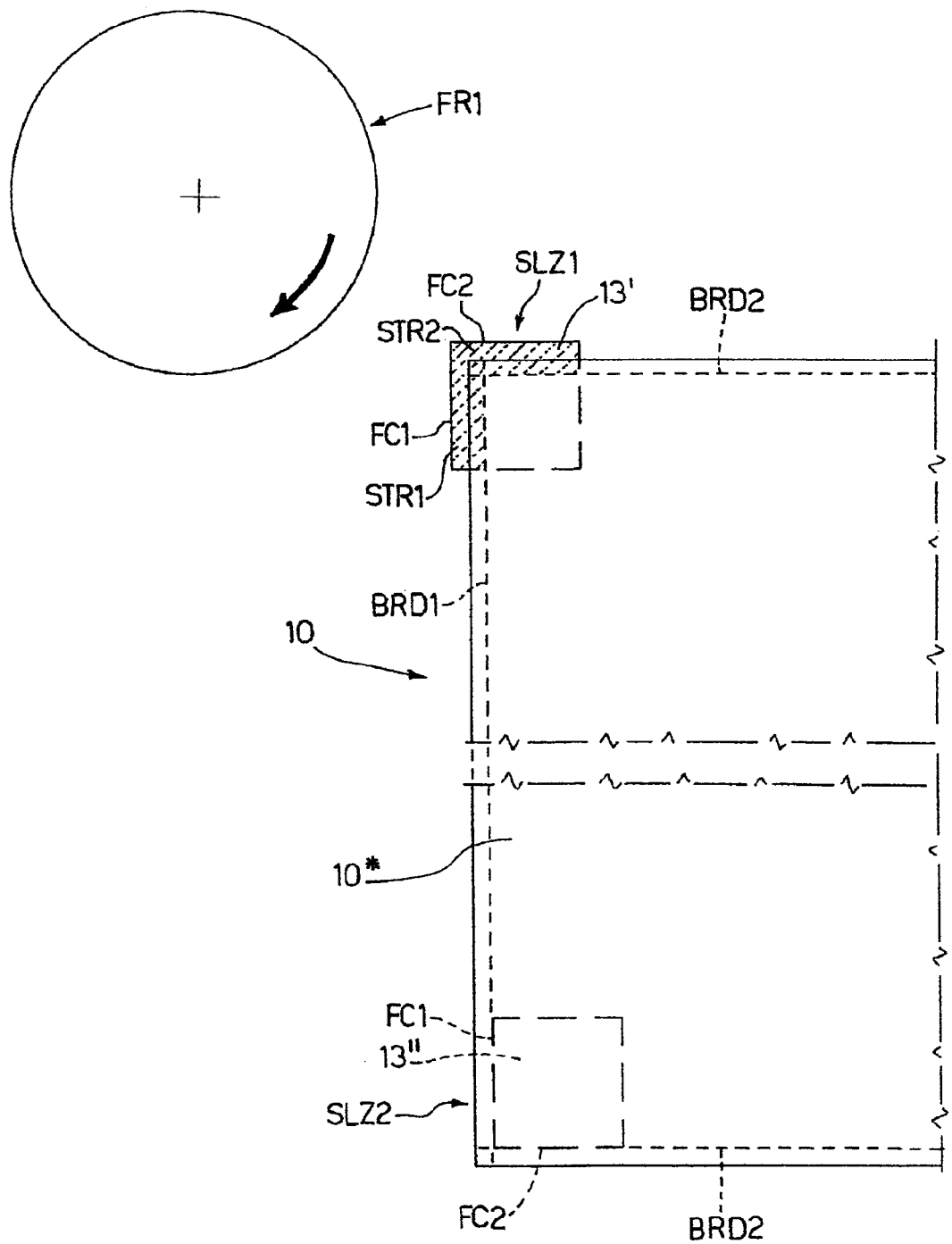
FIG. 8 shows alternative ways of inserting spacing block-shaped plugs inside a panel in accordance with the invention.

FIG. 8 shows two alternative ways of inserting spacing block-shaped plugs 13 inside sandwich blank 10* of panel 10 according to the invention.

In a first solution SLZ1 (top left in FIG. 8), a spacing block-shaped plug 13 is inserted so that its outer faces FC1, FC2 project slightly with respect to the reference edges BRD1, BRD2, and sandwich blank 10* is trimmed using a cutter assembly FR1 to also remove strips STR1, STR2 of spacing block-shaped plug 13.

In a second solution SLZ2 (bottom left in FIG. 8), a spacing block-shaped plug 13" is inserted with its faces FC1, FC2 practically flush with edges BRD1, BRD2, so that, in this case too, trimming of sandwich blank 10* by cutter assembly FR1 again produces a spacing block-shaped plug 13" with outer faces FC1, FC2 aligned with the finished edges of sandwich blank 10*.

Spacing block-shaped plugs 13 may be made of wood, wood fibre, plastic or similar.

Figure 9:
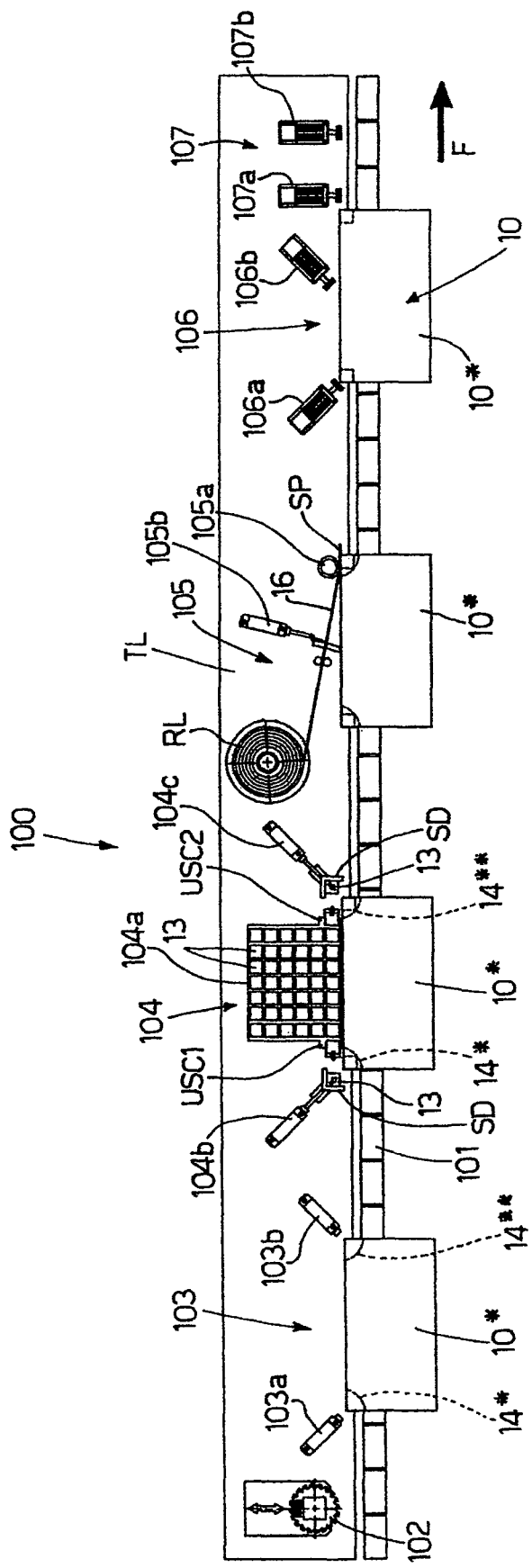
FIG. 9 shows a schematic of a first system for producing panels in accordance with the present invention; in this case, the panels produced are square-cornered (either square or rectangular)

FIG. 9 shows a schematic of a first system 100 for producing panels 10 in accordance with the present invention.

System 100 is basically, though not exclusively, designed for working square or rectangular sandwich blanks 10* of the type shown in FIGS. 1, 2, 3, 4, 5, 6, 7, 8.

System 100 comprises a frame TL supporting a number of devices in series.

System 100 also comprises a chain conveyor 101 for moving sandwich blanks 10* and relative panels 10 in the direction of arrow F.

System 100 also comprises a belt or a series of rollers (not shown) which operate parallel to chain conveyor 101 and apply a certain amount of pressure on the top surfaces of sandwich blanks 10* and panels 10 to ensure precise conveyance.

In system 100, the following devices are arranged in line:

(1) a cutter 102 for forming cavities 14*, 14** in sandwich blanks 10* travelling through;

(2) a device 103 for applying (or activating) fast-acting glue inside cavities 14*, 14** and/or on spacing block-shaped plugs 13; in the example shown, device 103 comprises two nozzles 103a, 103b for applying fast-acting glue;

(3) a device 104 for inserting spacing block-shaped plugs 13 inside respective cavities 14*, 14**, and which comprises a store 104a of spacing block-shaped plugs 13, with two outlets USC1, USC2; and two inserters 104b, 104c located at outlets USC1, USC2, and each of which receives a spacing block-shaped plug 13 inside an L-shaped push member SD, and pushes the spacing block-shaped plug inside a corresponding cavity 14, formed as stated in supple inner layer 12, and onto compact layers 11 of sandwich blank 10*, so that the spacing block-shaped plug is perfectly aligned with the two sides of the corner of sandwich blank 10*; incidentally, it should be noted that, to insert spacing block-shaped plug 13 inside a corresponding cavity 14 along one of the two sides L1 (FIG. 4), L-shaped push member SD is unsuitable, so a straightforward palette (not shown) is used, which pushes spacing block-shaped plug 13 into cavity 14 and onto compact outer layers 11 of sandwich blank 10*; store 104a of spacing block-shaped plugs 13 may also be provided with an orienting device (not shown) for rotating the in-transit spacing block-shaped plug 13 about an axis when necessary;

(4) a known edging device 105 for applying adhesive edging strip 16 (FIG. 3) onto outer peripheral faces 15; adhesive edging strip 16 is unwound off a reel RL, and edging device 105 comprises a known applicator 105a for applying edging strip 16, and a cutter 105b for cutting adhesive edging strip 16 to size;

(5) a trimming device 106 for removing any surplus portions SP of adhesive edging strip 16 off the corners of sandwich blank 10*, and which comprises at least two cutters 106a, 106b;

(6) a finishing and cleaning device 107 comprising cutters 107a, 107b and brushes (not shown), and which serves to cut off the portions of adhesive edging strip 16 projecting in height with respect to the thickness of sandwich blank 10*; and (7) an electronic central control unit (not shown) for controlling feed of panels 10 and the operating assemblies.

In an embodiment not shown, cutter 102 forms in an in-transit sandwich blank 10* cavities 14*, 14** that go beyond the supple inner layer and also partly involve the outer layers 11 of sandwich blank 10*.

In which case, the depth of the cavity equals the width of the spacing block-shaped plug, and the shoulders cut into the inner surfaces of outer layers 11 act as stops when inserting the spacing block-shaped plug.

In another embodiment, not shown, of the system, a cutter assembly FR1 as in FIG. 8 is inserted between inserting device 104 and edging device 105.

In another embodiment, not shown, of the system, as opposed to being fed from a store, the spacing block-shaped plugs are cut (or broken) to size off a reel or strips before being inserted on line.

In another embodiment, not shown, of the present invention, a spacing block-shaped plug is pressed into the inner layer of the sandwich blank, making use of the suppleness of the material of which the inner layer of the sandwich blank is made; which has the further advantage of not having to form a cavity beforehand in which to insert the spacing block-shaped plug.

Figure 10:
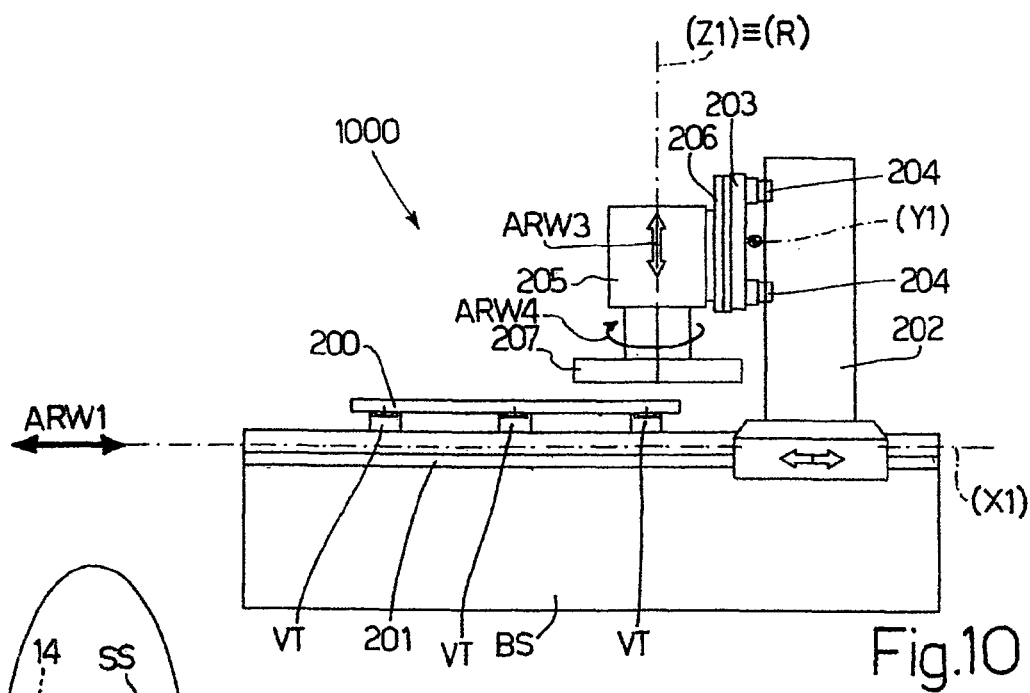
FIG. 10 shows a side view of a second system for producing other than rectangular or square panels.
Figure 11:
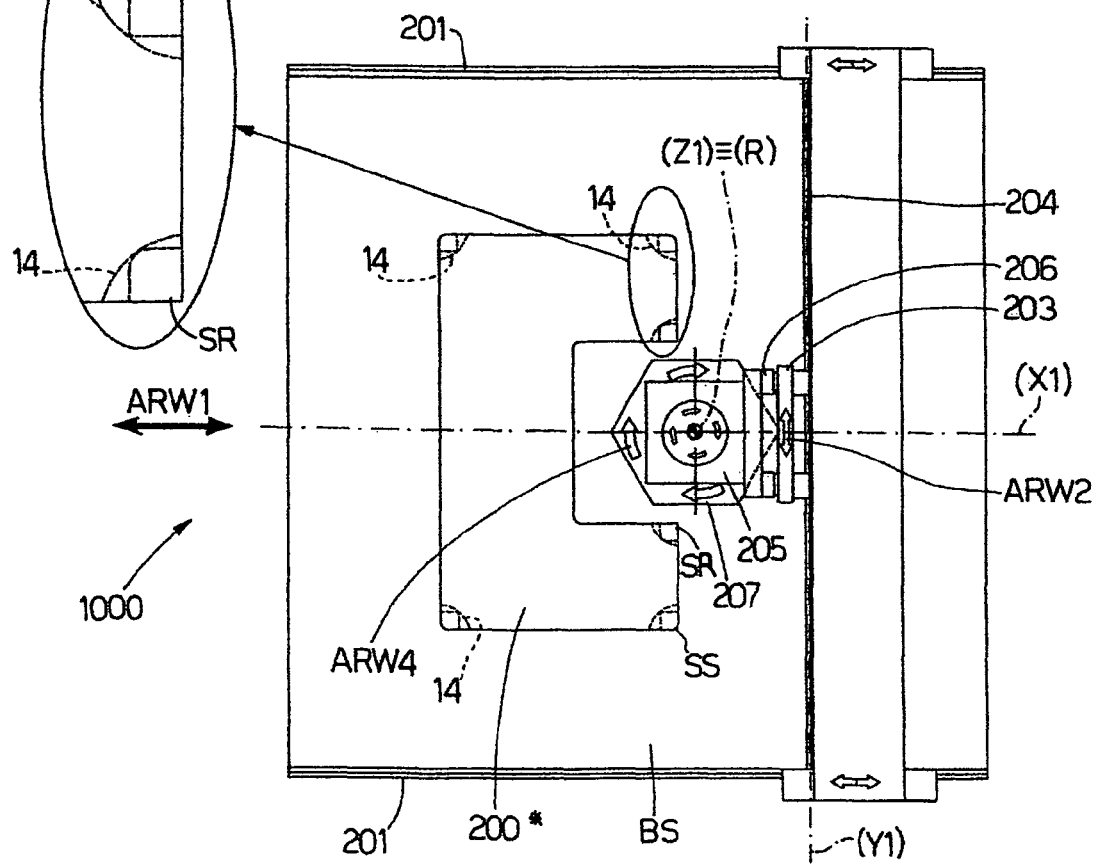
FIG. 11 shows a plan view of the second system in FIG. 10.

FIGS. 10, 11, 12 show a second system 1000 for producing a substantially C-shaped panel 200 (FIG. 10) from a sandwich blank 200* (FIG. 11).

System 1000 comprises a bed BS with two lateral runners 201 parallel to a central longitudinal axis of symmetry (X1).

A powered portal fixture 202 runs along lateral runners 201 in the two-way direction indicated by double arrow ARW1.

A powered carriage 203 is mounted on powered portal fixture 202, and moves on two runners 204 along an axis (Y1) in the two-way direction of double arrow ARW2. Axis (Y1) is perpendicular to axis (X1), even if the two are not coplanar.

Powered carriage 203 is fitted with a powered head 205 which moves on runners 206 along an axis (Z1) in the two-way direction of double arrow ARW3. Axis (Z1) is perpendicular to axes (X1) and (Y1), even if no two of the three axes (X1), (Y1), (Z1) are coplanar.

Powered head 205 comprises a tool-holder assembly 207 which, in the FIGS. 10, 11, 12 embodiment, is hexagonal, and which rotates in the direction of arrow ARW4 about an axis (R) coincident with axis (Z1).

For the sake of simplicity, tool-holder assembly 207 is shown in FIGS. 10 and 11 without tools (or operating assemblies), which are shown in detail in FIG. 12.

As shown in the FIG. 12 enlargement, a particular device is fitted to each side of tool-holder assembly 207.

Each device is moved into working position, as required, to work on sandwich blank 200* by rotating tool-holder assembly 207.

More specifically, one side S1 of tool-holder assembly 207 is fitted with at least one cutter 208 for forming cavities 14 in sandwich blank 200*, which is held firmly on bed BS by a number of suction cups VT (FIG. 10).

Another side S2 is fitted with an inserter 209 with an L-shaped push member SD; and a spacing block-shaped plug 213 is fed to push member SD, by means not shown, from a store 210 integral with a side S3 of tool-holder assembly 207.

Tool-holder assembly 207 also comprises a device (not shown) for applying or activating glue on sandwich blanks 200* and/or spacing block-shaped plugs 213.

In the second embodiment shown in FIGS. 10, 11, 12, spacing block-shaped plug 213, shown in detail in the FIG. 12 enlargement, has two perpendicular straight sides K1, K2, and a curved third side K3 joining the free ends of the two straight sides K1, K2.

In a variation also shown in FIG. 12, spacing block-shaped plug 213 also comprises a curved fourth side K4.

As shown in FIG. 12, store 210 is equipped with a straight guide 211 for guiding any spacing block-shaped plug 213 to push member SD.

Straight guide 211 is interrupted by an orienting device 212 which, when necessary, rotates the in-transit spacing block-shaped plug 213 about an axis (T) in the direction of arrow ARW5, for the reasons explained below.

The devices fitted to tool-holder assembly 207 also comprise a cutter 214 located on a side S4 and for shaping the periphery of sandwich blank 200*(FIGS. 10, 11).

Shaping by cutter 214 is obviously done before cavities 14 are formed and before spacing block-shaped plugs 213 are inserted inside cavities 14.

A side S5 is fitted with an edging device 215 for applying adhesive edging strip 16 (FIG. 3)—unwound off a reel RL—onto the peripheral outer faces of sandwich blank 200*, and which comprises a known applicator 215a for applying adhesive edging strip 16, and a cutter 215b for cutting adhesive edging strip 16 to size.

Finally, a side S6 is fitted with a finishing and cleaning device 216 comprising cutters and brushes (not shown), and which serves to cut off the portions of adhesive edging strip 16 projecting in height with respect to the thickness of sandwich blank 200*.

System 1000 in the second embodiment of the present invention operates as follows:

(A) an operator (not shown) fixes a substantially rectangular starting panel (not shown) to bed BS using suction cups VT;

(B) a sandwich blank 200* is cut to shape from the rectangular starting panel by cutter 214; so tool-holder assembly 207 is moved about the starting panel by portal fixture 202, powered carriage 203, and powered head 205 to form sandwich blank 200*;

(C) cutter 208 forms cavities 14 in which to insert spacing block-shaped plugs 213;

(D) at this point, tool-holder assembly 207 is positioned so a spacing block-shaped plug 213 is fed from store 210 to push member SD by means not shown; as it travels along straight guide 211, spacing block-shaped plug 213 is rotated, if necessary, by orienting device 212; in this connection, it should be pointed out that, in the FIG. 12 system, spacing block-shaped plug 213 is oriented in push member SD with sides K1 and K2 of spacing block-shaped plug 213 facing outwards, and so forms a rounded corner SS (FIG. 11) when inserted inside a corresponding cavity 14; conversely, if oriented in push member SD with its curved third side K3 facing outwards, spacing block-shaped plug 213, when inserted inside corresponding cavity 14, forms a square corner SR (FIG. 11); and (E) all or part of the outer periphery of panel 10 is edged and trimmed.

In a further embodiment not shown, the operating assemblies are parked in a parking area and picked up individually, as required, by powered head 205 by means of a known fast-fit coupling, so that, in this case too, each device is operated as required on sandwich blank 200*.

Other embodiments not shown also provide for controlled movement of the suction cup support supporting sandwich blank 200*, which is therefore worked by a combination of movements of tool-holder assembly 207 and the support supporting sandwich blank 200*.

Moreover, operating as shown, a multiple-shaped spacing block-shaped plug may be employed and oriented as required to adapt to respective shapes of the panel.

The advantages of the present invention are as follows:
- the spacing block-shaped plugs inserted inside the corners of the panels have the advantage (besides permitting perfect gluing of the edging strips at the corners of the panel) of being drillable to insert the panel connecting dowels essential to the construction and solidity of furniture or any assembled structure; if inserted along one side of the panel, the spacing block-shaped plugs may serve as hinge supports;
- if particularly precise assembly is not an issue, the spacing block-shaped plugs may be drilled beforehand to eliminate drilling at later stages in the manufacture of the panel.

The invention claimed is:

1. A method of manufacturing frameless panels; the method comprising the steps of:
   (a) cutting a frameless sandwich blank from a strip or from a large sandwich panel produced in a manufacturing system, said frameless sandwich blank having two outer layers of more consistent material, and a supple inner layer of lesser consistency;
   (b) inserting at least two discrete spacing block-shaped plugs between the two outer layers inside the supple inner layer of said sandwich blank at at least two corners of said sandwich blank, one or more additional block-shaped plugs optionally being inserted at discrete locations along at least one lateral side of said blank; and
   (c) machining a lateral side of the frameless sandwich blank and of the at least one of said at least two discrete spacing block-shaped plugs with a tool.

2. The method as claimed in claim 1, wherein at least one of said two discrete block-shaped plugs is capable of providing support for hardware fixtures.

3. The method as claimed in claim 2, wherein at least one of said two discrete blocked-shaped plugs is made of wood, wood fiber or plastic.

4. The method as claimed in claim 1, wherein each of said at least two spacing block-shaped plugs is either housed inside a corresponding cavity formed in said supple inner layer or is housed inside a corresponding cavity which goes beyond the suppler inner layer, so as to form shoulders on the inner surfaces of the outer layers.

5. The method of manufacturing panels as claimed in claim 1; wherein said panel has a lateral side, said method further comprising the step of:
   (d) edging at least a portion of the lateral side of the sandwich blank with an adhesive edging strip.

6. The method as claimed in claim 1, wherein one or more additional block-shaped plugs is being inserted at one or more discrete locations along at least one lateral side of said sandwich blank, said block-shaped plugs being inserted at a point adapted for mounting hardware.

7. The method as claimed in claim 1, wherein at least one glue retaining groove is formed on inner surfaces of the outer layers where the at least one of said two discrete spacing block-shaped plugs is to be inserted and/or on the surface of the at least one of said two discrete spacing block-shaped plugs.

8. The method as claimed in claim 1, wherein the step of optionally inserting one or more additional block-shaped plugs at discrete locations along at least one lateral side of said blank is performed prior to the machining.

* * * * *